May 16, 1950     W. F. BARTHEL     2,507,495
FISHHOOK RELEASING DEVICE
Filed Dec. 30, 1946
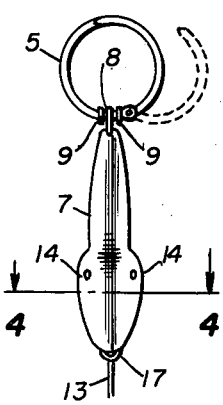
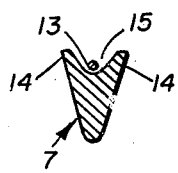
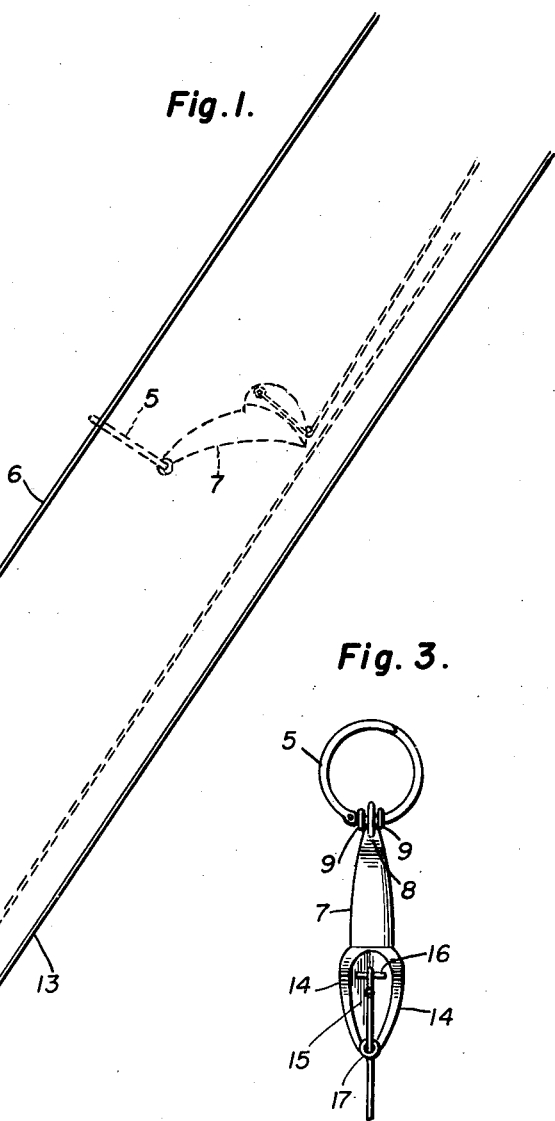
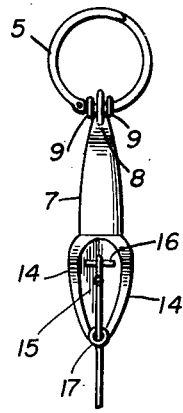
Inventor
William F. Barthel
By Clarence A. O'Brien
and Harvey B. Jacobson
Attorneys Patented May 16, 1950

2,507,495

UNITED STATES PATENT OFFICE 2,507,495

FISHHOOK RELEASING DEVICE

William F. Barthel, Chicago, Ill.

Application December 30, 1946, Serial No. 719,242

3 Claims. (Cl. 43—17.2)

This invention relates to a device for use in releasing a fish hook from an underwater object after having become snagged in the latter.

More particularly, the present invention relates to an improved fish hook releasing device of the type embodying a swinging weight adapted to be lowered along the fishing line onto the snagged hook, and a pull line connected to the weight for oscillating the latter and thereby imparting repeated blows calculated to release the hook or cause disengagement of the same from the object in which it is snagged.

An object of the present invention is to provide a fish hook releasing device of the above kind which is simple in construction, easy to use, and efficient in operation.

A further object is to provide a device of the above kind including a novel form of weight and means for attaching the pull line thereto so to guide the pull line and prevent excessive wear of or damage to the pull line.

The exact nature of the present invention will become apparent from the following description when considered in connection with the accompanying drawing, in which:

Figure 1 is a fragmentary elevational view illustrating the present fish hook releasing device as it appears in use;

Figure 2 is a front elevational view of the split ring and the weight hinged thereto;

Figure 3 is a rear elevational view of the construction shown in Figure 2; and,

Figure 4 is a horizontal section taken on line 4—4 of Figure 2.

Referring to the drawing in detail, the present fish hook releasing device includes a split ring 5 of conventional form which is adapted to be manually opened to be received on a fishing line 6 and to be manually closed for being maintained on said fishing line. The type of split ring shown comprises hingedly connected sections having overlapping free ends provided with detent means for holding the ring closed but permitting manual opening thereof.

An elongated weight 7 is hinged at its upper end to the ring 5 as at 8, for swinging movement relative to the ring 5 in a plane at a right angle to the plane of said ring. Suitable means 9 is provided to prevent accidental separation of the ring 5 and weight 7. The function of the ring 5 is to guide the weight 7 downwardly along the line 6 into proximity of the hook 10 which has become snagged in an underwater object 11 and which is connected with the lower end of the fishing line 6. While the device may be used when the hook is directly carried by the fishing line, it is shown in use in connection with an artificial bait or lure 12 attached to the lower end of the fishing line 6 and carrying the hook 10. A pull line 13 is attached at one end to the lower part of the weight 7 for oscillating the latter as illustrated in Figure 1 so as to impart repeated blows to the snagged hook or the bait carrying the latter, and to thereby effect release of the hook from the object 11.

As shown, the lower portion of the weight 7 is flared rearwardly and has a forwardly and downwardly curved rear edge. Also, the lower portion of the weight is provided with rearward wing extensions 14 at opposite sides of said curved edge so as to define a groove 15. A cross pin 16 is carried by the wing extensions 14 and spans the rear upper end of the groove 15. Also, an eye member 17 is carried by the weight at the front lower end of the groove 15, and the pull line 13 is attached at one end to the cross pin 16 and is extended from the latter in the groove to and through the eye member 17. By reason of this construction and arrangement, the pull line 13 is effectively guided, undue wear of or damage to the pull line is prevented, and swinging of the weight 7 is effectively accomplished.

In using the device, the ring 5 is opened to receive the fishing line and the ring is then closed to retain it on the fishing line. The ring and weight are then lowered on the fishing line by providing slack in the pull line 13, the ring 5 sliding downwardly along the fishing line 6 until it rides onto the shank of the hook 10 which is snagged in the underwater object 11. The pull line 13 is then alternately pulled and provided with slack, thereby oscillating the weight 7 about the hinge axis at 8. In this way the weight is caused to provide repeated blows calculated to disengage the hook 10 from the object 11 so that the hook may be retrieved.

From the foregoing description, it will be seen that I have provided a device so constructed as to effectively carry out the stated objects of the invention. Minor changes in details of construction are contemplated, such as fairly fall within the scope of the invention as claimed.

What I claim is:

1. In a fishhook releasing device, an elongated non-buoyant weight reduced in width and apertured at one end to provide an ear for pivotal reception on a split guide ring, the other end of said weight being flared rearwardly and provided at opposite sides with diverging rearward wing extensions having forwardly and downwardly curved edges thereby defining a groove therebetween, and a pull line attached at one end to said weight and extending from the latter at the front lower end of said groove.

2. In a fishhook releasing device, an elongated non-buoyant weight having a transverse opening at one end for pivotal reception on a split guide ring, the other end of said weight being flared rearwardly and provided at opposite sides with rearward wing extensions having forwardly and downwardly curved edges thereby defining a groove therebetween, a cross pin carried by said wing extensions and spanning the rear upper end of said groove, an eye member carried by the weight at the front lower end of said groove, and a pull line attached at one end to said cross pin and extending forwardly from the latter within said groove to and through said eye member.

3. In a fishhook releasing device, an elongated non-buoyant weight apertured at one end for pivotal reception on a split guide ring, the other end of said weight being flared rearwardly and provided at opposite sides with diverging rearward wing extensions having forwardly and downwardly curved edges thereby defining a groove therebetween, and a pull line attached at one end to said weight and extending from the latter at the front lower end of said groove.

WILLIAM F. BARTHEL.

REFERENCES CITED

The following references are of record in the file of this patent:

UNITED STATES PATENTS

| Number | Name | Date |
|---|---|---|
| 1,209,022 | Phinney | Dec. 19, 1916 |
| 2,353,357 | Paulick | July 11, 1944 |